United States Patent
Park et al.

(10) Patent No.: US 8,920,950 B2
(45) Date of Patent: Dec. 30, 2014

(54) POUCH TYPE BATTERY CELL AND MODULE HAVING EXHAUST PART IN A REGION OF THE SEALING PART

(75) Inventors: Hee Chan Park, Daejeon (KR); Sang Bum Kim, Seoul (KR)

(73) Assignee: SK Innovation Co., Ltd. (KR)

( * ) Notice: Subject to any disclaimer, the term of this patent is extended or adjusted under 35 U.S.C. 154(b) by 94 days.

(21) Appl. No.: 13/532,914

(22) Filed: Jun. 26, 2012

(65) Prior Publication Data

US 2013/0115487 A1 May 9, 2013

(30) Foreign Application Priority Data

Nov. 8, 2011 (KR) .................. 10-2011-0115682

(51) Int. Cl.
*H01M 2/12* (2006.01)
*H01M 2/02* (2006.01)
*H01M 2/08* (2006.01)
*H01M 2/10* (2006.01)

(52) U.S. Cl.
CPC .......... *H01M 2/1241* (2013.01); *H01M 2/1061* (2013.01); *Y02E 60/12* (2013.01); *H01M 2/0212* (2013.01)
USPC ............................... 429/53; 429/56; 429/185

(58) Field of Classification Search
CPC ............ H01M 2/1241; H01M 2/1223; H01M 2/1229; H01M 2/1235; H01M 2/1294
USPC ................................. 429/53, 56, 185
See application file for complete search history.

(56) References Cited

U.S. PATENT DOCUMENTS

2003/0232236 A1* 12/2003 Mitchell et al. .................. 429/56
2007/0190402 A1* 8/2007 Kumeuchi et al. .............. 429/53

FOREIGN PATENT DOCUMENTS

| JP | 11086823 A | * | 3/1999 |
| JP | 2003242952 A | * | 8/2003 |
| JP | 2004234899 A | * | 8/2004 |
| JP | 2005116235 | | 4/2005 |
| KR | 1020050031307 | | 4/2005 |
| WO | WO 2006016535 A1 | * | 2/2006 |

OTHER PUBLICATIONS

IPDL Machine Translation of the Detailed Description of JP 11-086823A (Mar. 1999).*

* cited by examiner

*Primary Examiner* — Gregg Cantelmo
(74) *Attorney, Agent, or Firm* — Cantor Colburn LLP

(57) ABSTRACT

Provided are a battery cell and a battery module including the same, and more particularly, the battery cell can secure safety thereof, by forming an exhaust part in a predetermined region of a sealing part to have a sealing member thicker than the other region of the sealing part so that the exhaust part has relatively weaker adhesive strength than the sealing part not containing the exhaust part, and thus, the adhesive state of the exhaust part is broken when high pressure occurs within the cell due to overheat conditions such as overcharging or inner short circuits to cause a case of the cell to swell, thereby discharging out the substances within a pouch type secondary cell.

2 Claims, 5 Drawing Sheets

POUCH TYPE BATTERY CELL AND MODULE HAVING EXHAUST PART IN A REGION OF THE SEALING PART

CROSS-REFERENCE TO RELATED APPLICATIONS

This application claims priority under 35 U.S.C. §119 to Korean Patent Application No. 10-2011-0115682, filed on Nov. 8, 2011, in the Korean Intellectual Property Office, the disclosure of which is incorporated herein by reference in its entirety.

TECHNICAL FIELD

The following disclosure relates to a battery cell having improved safety and a battery module including the same.

BACKGROUND

As an interest in energy and environment is increased, the demand for secondary cells is sharply increased. Among them, a lithium secondary cell having high energy density and discharge voltage is actively being researched and developed.

Particularly, the lithium secondary cell is largely used as a power source of cellular phones, notebook computers, digital cameras, and electric cars.

Meanwhile, the lithium secondary cell has excellent electric properties but low safety.

More specifically, in the lithium secondary cell, heat and gas are generated when a degradation reaction is continuously induced under abnormal conditions, such as overcharge, overdischarge, exposure to high temperature, short circuits, or the like. Here, as the degradation reaction is further promoted under high temperature and high pressure due to the above conditions, the lithium secondary cell may be ignited or exploded.

These problems may bring about more severe large accidents in a large and medium sized battery pack having plural battery cells.

The large and medium sized battery pack has a plurality of battery cells or unit modules within a frame having a predetermined space thereof. As the plurality of battery cells and unit modules swell, the pressure inside a case may be rapidly increased.

A fuse, a bimetal, and a battery management system (BMS) are provided in the secondary cell module in order to solve the problems, but these constitutions can not secure sufficient safety.

In particular, the BMS senses electric errors (overdischarge, overcharge, and overcurrent) at the normal state to control the overall module, thereby securing safety. However, when the BMS is not operated at the abnormal state, the overall control thereby is difficult, and thus, the plurality of battery cells swell, resulting in high risk of ignition or explosion.

Moreover, in a case of a pouch type battery cell in which the electrolytic solution is injected into all-integrated cells, when each cell is over-discharged, voltage becomes increased and the electrolytic solution within the cell becomes degraded due to overheat, and thus, inflammable gas is generated within the cell and an inner pressure of the pouch is increased, resulting in a swelling phenomenon in which the pouch itself swells.

Further, a separator between a cathode and an anode melts, which causes the cathode and the anode to be short-circuited, resulting in ignition, and thus, safety of the cell can not be secured.

Due to these safety problems of the lithium secondary cell, various thermal safety tests such as, a high-temperature storage test, a thermal shock test, a thermal exposure test, as well as safety tests such as over-discharging and compulsory discharging, are conducted before the completed cell are put on the market. According to these thermal safety tests, the cell is left for several tens of minutes to several tens of hours under various temperature conditions. Here, the cell should not be exploded and ignited, or in extreme cases, the cell should be unsealed to prevent explosion and ignition thereof.

The related arts disclose techniques for solving the above-described problem that an inside pressure of the pouch type secondary cell is increased due to an excess amount of gas generated by overcurrent.

Korean Patent No. 0560158 ("Lithium Secondary Cell", hereinafter, Document 1) discloses a structure functioning as an anti-explosion safety member in which an adhesive layer is partially formed on an outer surface of a packing of the cell, and thus, the packing is abruptly ruptured to prevent explosion of the cell when an inner pressure of the cell is increased to above a critical value to swell the packing.

According to Document 1, the above-described problem can be solved to some degree because abrupt explosion is prevented. However, since gas is exhausted when the cell swells and then a portion of the packing, on which the adhesive layer is not formed, is finally ruptured, explosion itself still occurs although the intensity of cell explosion is decreased, therefore failing to solve the problems completely.

Therefore, various techniques for preventing explosion or ignition at the time when swelling of the lithium secondary cell occurs are needed.

RELATED DOCUMENT

Patent Document (Patent Document 1) Korean Patent No. 0560158 (Mar. 16, 2006)

SUMMARY

An object of the present invention is directed to providing a battery cell capable of securing safety, by forming an exhaust part in a predetermined region of a sealing part to have a sealing member thicker than the other region of the sealing part so that the exhaust part has relatively weaker adhesive strength than the sealing part not containing the exhaust part, and thus, the adhesive state of the exhaust part is broken when high pressure occurs within the cell due to overheat conditions such as overcharging or inner short circuits to cause a case of the cell to swell, thereby discharging out the substances within the pouch type cell.

Another object of the present invention is directed to providing a battery cell capable of preventing a decrease in productivity even without further constitutions or processes, by forming an exhaust part having weak adhesive strength through a simple manner in which the forming thickness of the sealing member for case sealing is changed.

Still another object of the present invention is directed to providing a battery cell capable of preventing the risks of firing, explosion, or the like due to generation of gas or overheating, thereby improving safety thereof, by breaking the sealing state of the case through the exhaust part to discharge out electrolytic solution and gas within the cell at the time of swelling of the case.

In one general aspect, there is provided a battery cell, including: a battery unit including a first electrode part, a second electrode part, and a separator; a first electrode tap and a second electrode tap extended from the first electrode part and the second electrode part, respectively; and a case sealed in a pouch type such that the first electrode tap and the second electrode tap are protruded outwardly and the first electrode part, the second electrode part, and the separator are included therein, the case including a sealing part having a sealing member applied therein and an exhaust part defined by a predetermined region of the sealing part having a sealing member thicker than the other region of the sealing part.

The battery cell may be sealed by bonding an applied region of the sealing member for forming the sealing part and the exhaust part through heat fusion.

The exhaust part may have weaker adhesive strength than the sealing part not containing the exhaust part.

In another aspect, there is provided a battery module having a plurality of the battery cells as described above stacked therein.

Other features and aspects will be apparent from the following detailed description, the drawings, and the claims.

DETAILED DESCRIPTION OF MAIN ELEMENTS

Figure 1:
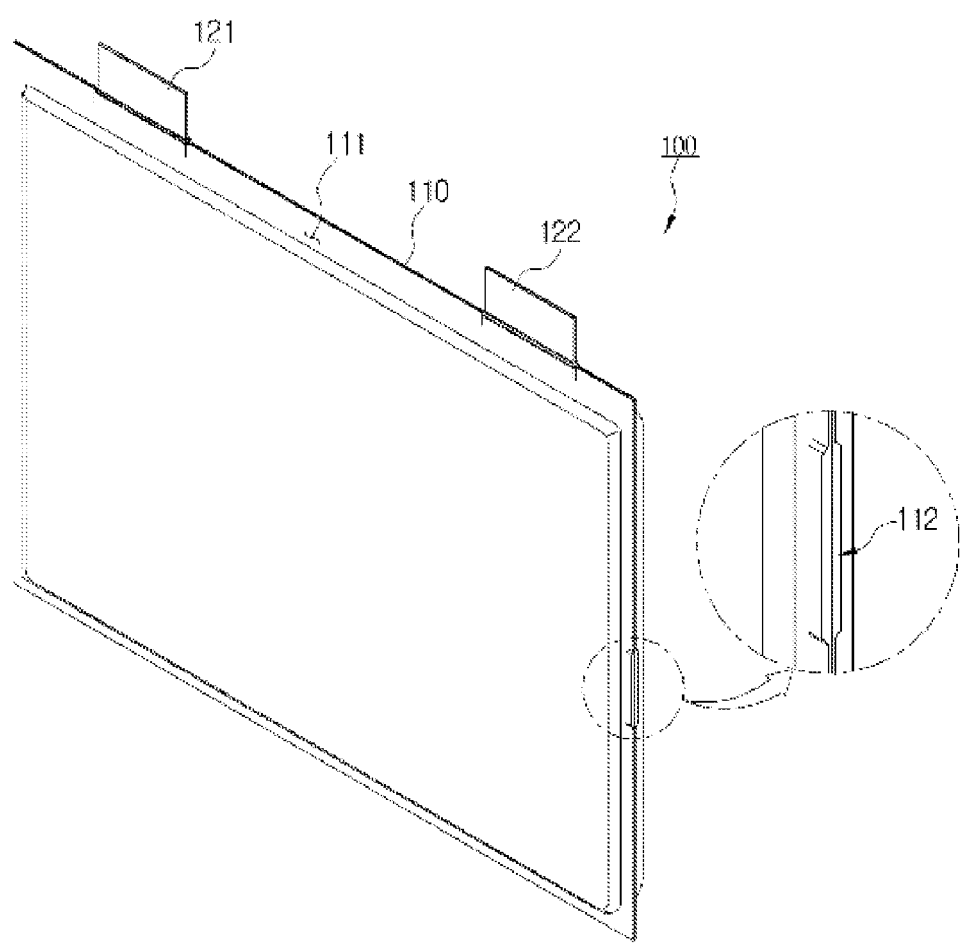
FIGS. 1 to 3 are a perspective view, an exploded perspective view, and a cross-sectional view of an embodiment according to the present invention.

100: battery cell
110: case
112: exhaust part
120: battery unit
122: second electrode part
130: first electrode tap
140: second electrode tap
A: sealing member
A1: forming thickness of sealing member of sealing part (not containing exhaust part)
A2: forming thickness of sealing member of sealing part (containing exhaust part)
111: sealing part
121: first electrode part
123: separator

DETAILED DESCRIPTION OF EMBODIMENTS

Hereinafter, a battery cell 100 and a battery module including the same of the present invention will be described in detail with reference to the accompanying drawings.

A battery cell 100 of the present invention includes a battery unit 120, a first electrode tap 130, a second electrode tap 140, and a case 10.

The battery unit 120 is provided within the case 110, and includes a first electrode part 121 and a second electrode part 122.

A separator 123 is provided between the first electrode part 121 and the second electrode part 122. The first electrode part 121, the separator 123, and the second electrode part 122 are provided together with an electrolytic solution within the case 110.

The first electrode tap 130 and the second electrode tap 140 are protruded outwardly from the case 110, for power connection. The first electrode tap 130 and the second electrode tap 140 are extended from the first electrode part 121 and the second electrode part 122, respectively.

Generally, the first electrode tap 130 and the second electrode tap 140 are welded to the first electrode part 121 and the second electrode part 122.

The case 110 is a base body that constitutes the battery cell 100, and sealed in a pouch type.

In other words, a sealing part 111 is formed to seal the case 110 in a pouch type through application and adhesion of a sealing member A.

The sealing state of the sealing part 111 is kept such that the first electrode tap 130 and the second electrode tap 140 are protruded outwardly from the case and the battery unit 120 including the first electrode part 121, the second electrode part 122, and the separator 123 is not contacted with the outside.

Here, the sealing state of the case 110 is kept by adhesion due to application of the sealing member A as well as bonding due to heat fusion at the applied region of the sealing member A.

The case 110 includes an exhaust part 112, and here, this exhaust part 112 is defined by a predetermined region of the sealing part 111 in which the sealing member A is formed thicker than that of the other region of the sealing part 111.

Figure 3:
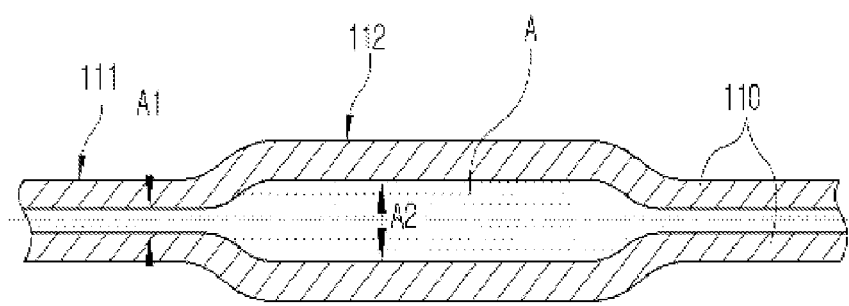

In FIG. 3, a forming thickness of the sealing member A that constitute the sealing part 111 not containing the exhaust part 112 is designated as a reference sign A1, and a forming thickness of the sealing member A that constitutes the exhaust part 112 is designated as a reference sign A2.

Again referring to FIG. 3, in the battery cell 100 according to the embodiment of the present invention, the forming thickness of the sealing member, A2, of the exhaust part 112 is thicker than the forming thickness of the sealing member, A1, of the sealing part 111, and thus, adhesive strength of the exhaust part 112 is weaker than that of the sealing part 111.

In other words, the exhaust part 112 has a sealing member A, which is thicker than that of the other region of the sealing part 111, thereby exhibiting weak adhesive strength. For this reason, in a case where high pressure occurs within the battery due to overheating conditions such as overcharging, inner short circuiting, and the like, the sealing state of the battery and the battery module of the present invention becomes broken through the exhaust part 112, and thus, the electrolytic solution or gas within the case 110 is discharged out, thereby preventing explosion and ignition in advance.

Figure 2:
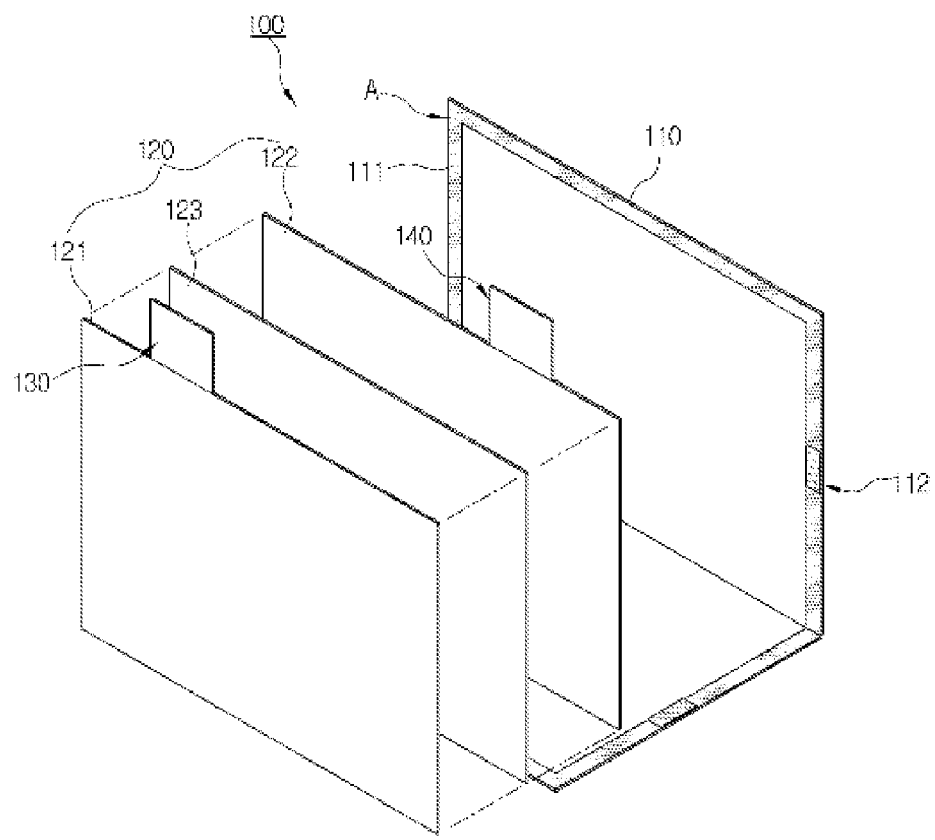
Figure 4:
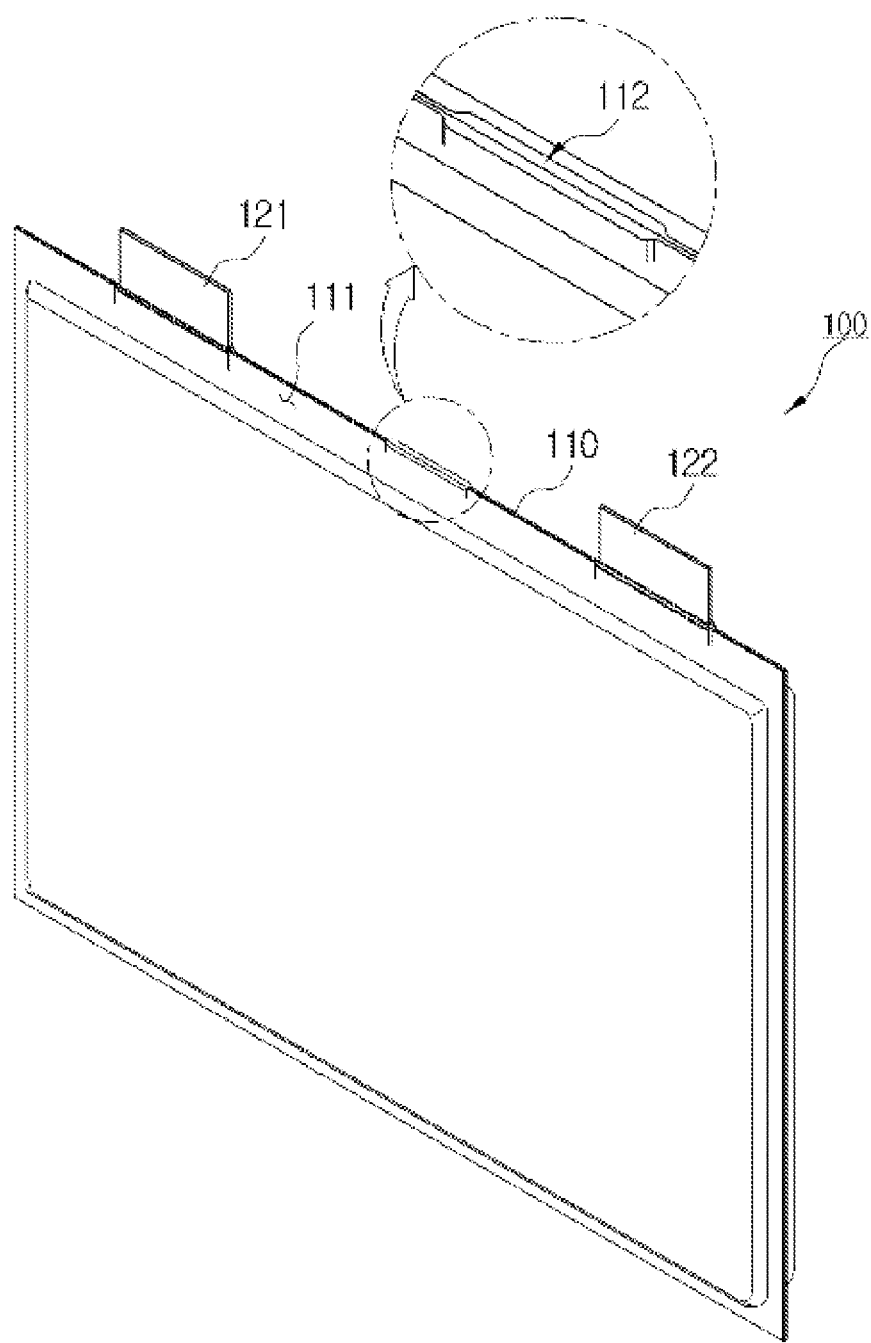
FIG. 4 is a perspective view of another embodiment according to the present invention.

A case where the exhaust part 112 is formed at a front side of both sides of the battery cell 100 is shown in FIGS. 1 and 2, and a case where the exhaust part 112 is formed at an upper side of the battery cell 100 is shown in FIG. 4.

Figure 5:
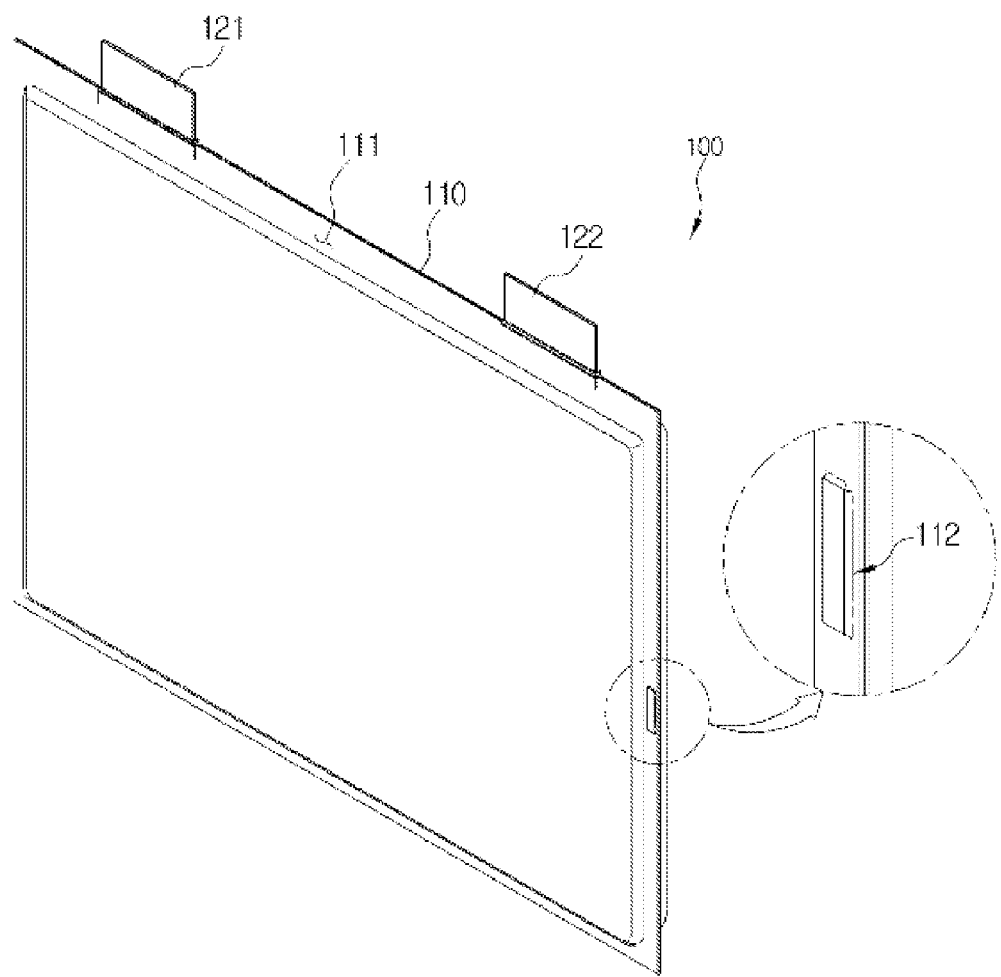
FIGS. 5 and 6 are a perspective view and an exploded perspective view of still another embodiment according to the present invention.
Figure 6:
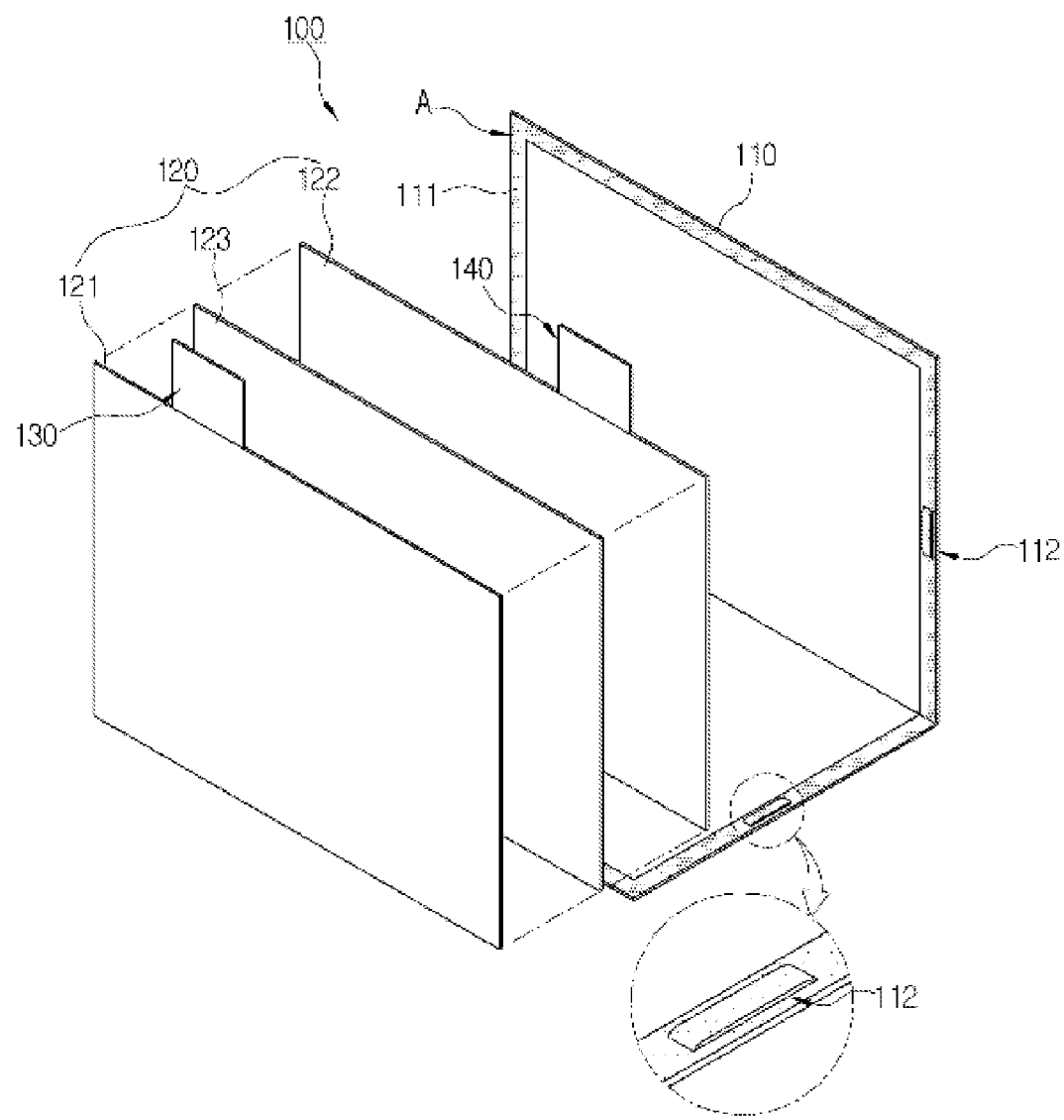

In addition, as for a battery cell 100 shown in FIGS. 5 and 6, an exhaust part 112 is formed at a front side of both sides of the battery cell 100, like the battery as shown in FIGS. 1 and 2, but the exhaust part 112 as shown in FIGS. 5 and 6 is different from the exhaust part 112 as shown in FIGS. 1 and 2 in view of the applied region of sealing member A.

More specifically, in the battery cell 100 shown in FIGS. 5 and 6, a sealing part 111—an exhaust part 112—a sealing part 111 are formed from an inside of the case 110 toward the outside. A sealing member A of a predetermined region constituting the exhaust part 112 has a large thickness.

Further, in the battery cell 100 of the present invention, although not shown in the drawings, a sealing part 111—an exhaust part 112 or an exhaust part 112—sealing part 111 may be formed from the inside of the case 110 toward the outside.

The structures shown in the drawings are merely embodiments of the present invention, and the forming position and size of the exhaust part 112, the curved shape of the pouch, and the like may be more varied.

In order to form the sealing part 111 and the exhaust part 112 of the battery cell 100, as a first method, the applied thickness of the sealing member A may be controlled at the time of single application of the sealing member A. As a second method, the sealing member A may be firstly applied to form the sealing part 111 on the case 110 and the sealing member A may be secondly applied on a forming region of the exhaust part 112.

When the sealing part 111 and the exhaust part 112 are formed by the second method, the sealing member A used in the first application and the sealing member A used in the second application may be the same material or different materials.

When the sealing member A used in the first application and the sealing member A used in the second application are different materials, the sealing member A used in the second application may preferably include a material that can further degrade adhesive strength with the case 110.

As described above, according to the battery cell 100 according to the embodiment of the present invention, the exhaust part 112 is formed to have weak adhesive strength by merely changing the applied thickness of the sealing member A, which is to be applied for sealing the case 100, and thus, a decrease in productivity can be prevented without further constitutions or processes, and safety can be more improved.

Meanwhile, the battery module of the present invention includes a plurality of the above-described battery cells 100, and thus, safely useable as a large and medium sized battery module against exhaust of the electrolytic solution and gas through the exhaust part 112 at the time of swelling of each battery cell 100.

In particular, the battery cell 100 and the battery module including the same of the present invention can prevent risks of firing, explosion, or the like due to generation of gas or overheating, and thus improve the safety thereof.

The battery module (not shown) according to the present invention is not limited to the above-mentioned embodiments and an applied range thereof may be various. Also, various modifications of the present invention may be made by those skilled in the art without departing from the gist of the present invention.

The battery cell of the present invention can secure safety thereof, by forming the exhaust part in a predetermined region of the sealing part to have a sealing member thicker than the other region of the sealing part so that the exhaust part has relatively weaker adhesive strength than the sealing part not containing the exhaust part, and thus, the adhesive state of the exhaust part is broken when high pressure occurs within the cell due to overheat conditions such as overcharging or inner short circuits to cause a case of the cell to swell, thereby discharging out the substances within the pouch type secondary cell.

In particular, the battery cell of the present invention can prevent a decrease in productivity even without further constitutions or processes, by forming the exhaust part having weak adhesive strength through a simple manner in which the forming thickness of the sealing member for case sealing is changed.

In addition, the battery cell of the present invention can prevent the risks of firing, explosion, or the like due to generation of gas or overheating, thereby improving the safety thereof, by breaking the sealing state of the case through the exhaust part to discharge out electrolytic solution and gas within the cell at the time of swelling of the case.

What is claimed is:

1. A battery cell, comprising:
   a battery unit including a first electrode part, a second electrode part, and a separator;
   a first electrode tap and a second electrode tap extended from the first electrode part and the second electrode part, respectively; and
   a case sealed in a pouch type such that the first electrode tap and the second electrode tap are protruded outwardly and the first electrode part, the second electrode part, and the separator are included therein, the case including a sealing part having a sealing member applied therein and an exhaust part defined by a predetermined region of the sealing part having a sealing member thicker than adjacent regions of the sealing part, wherein the sealing member in the exhaust part consists of an adhesive sealant, and the exhaust part has an adhesive strength weaker than that of the sealing part not containing the exhaust part.

2. The battery cell of claim 1, wherein the battery cell is sealed by bonding an applied region of the sealing member for forming the sealing part and the exhaust part through heat fusion.

* * * * *